J. T. SMITH.
ATTACHMENT FOR THRESHING MACHINES.
APPLICATION FILED JUNE 11, 1917. RENEWED FEB. 2, 1920.

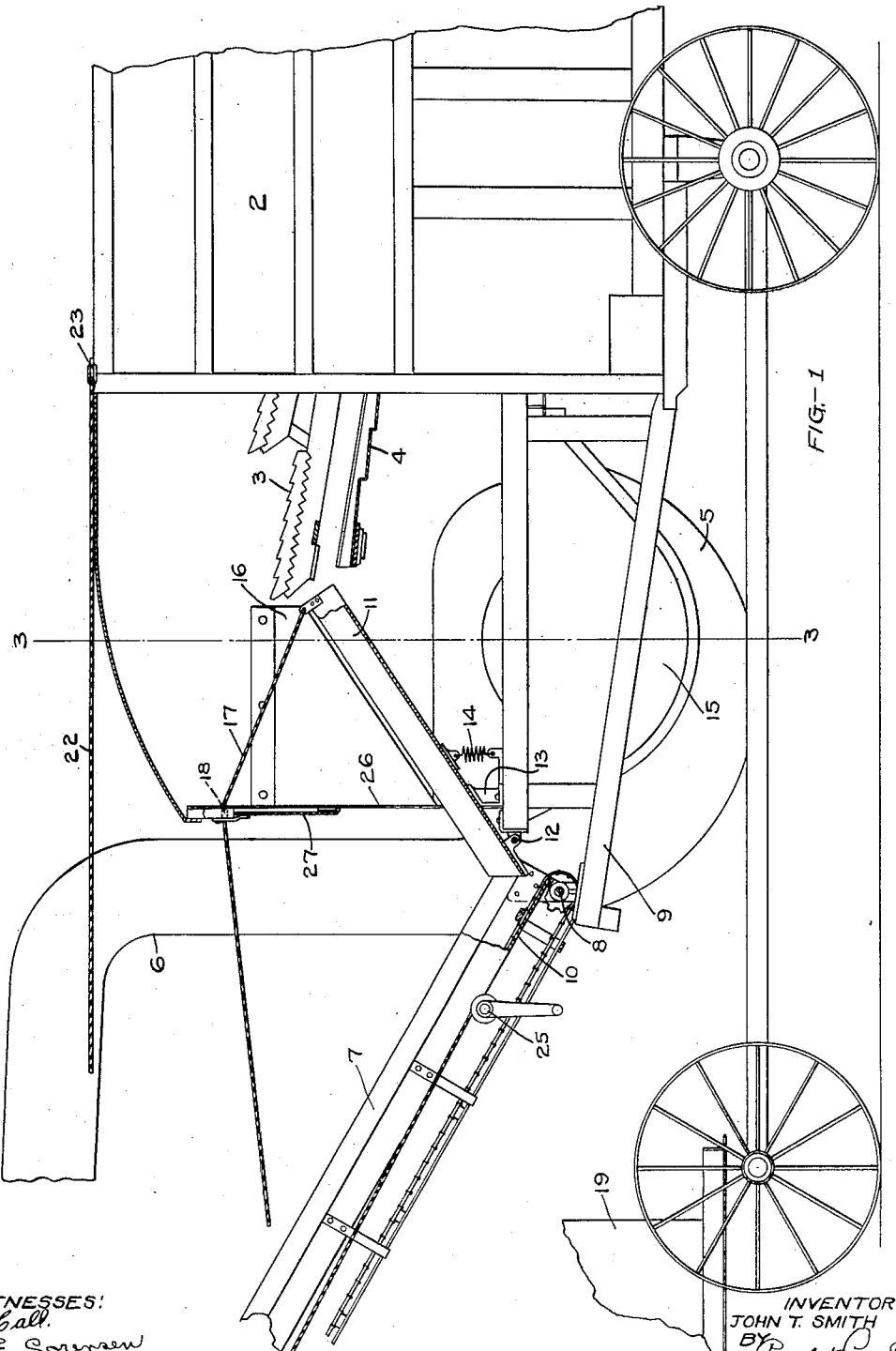

1,350,847.

Patented Aug. 24, 1920.
3 SHEETS—SHEET 2.

WITNESSES:

INVENTOR:
JOHN T. SMITH.
BY
ATTORNEYS.

J. T. SMITH.
ATTACHMENT FOR THRESHING MACHINES.
APPLICATION FILED JUNE 11, 1917. RENEWED FEB. 2, 1920.
1,350,847.
Patented Aug. 24, 1920.
3 SHEETS—SHEET 3.
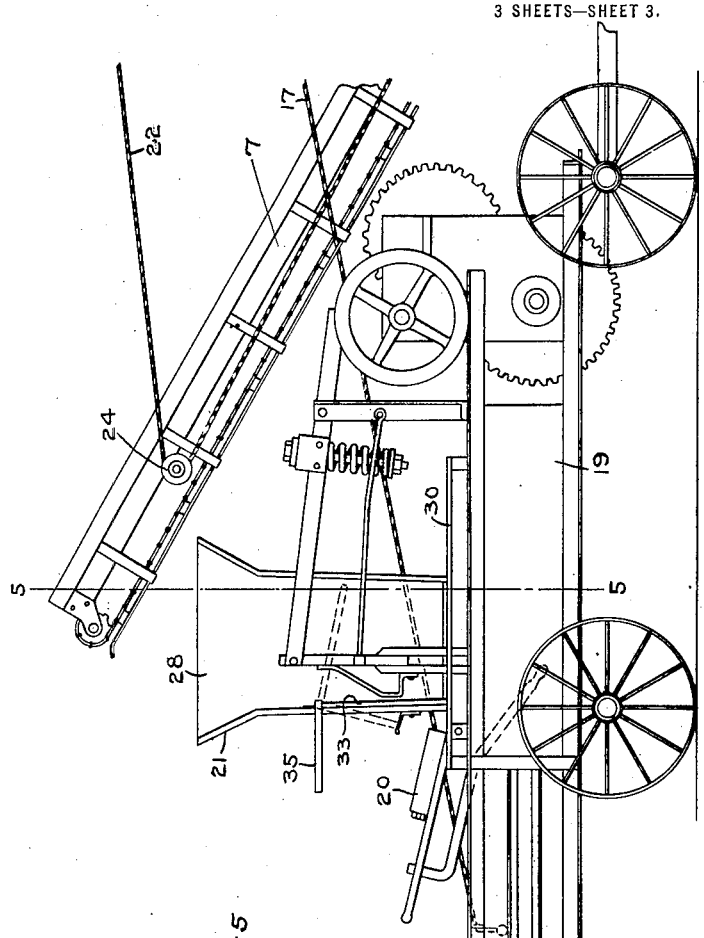
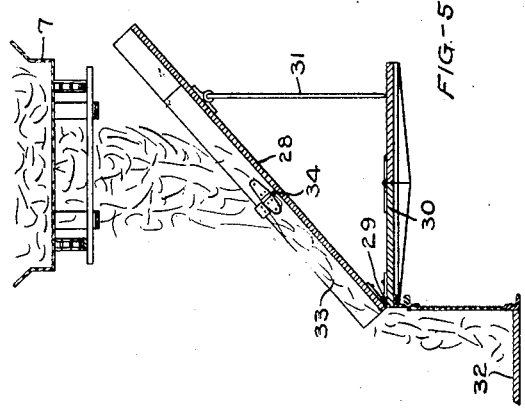
WITNESSES:
B. Hall
G. E. Sorensen
INVENTOR:
JOHN T. SMITH.
BY
ATTORNEYS.

UNITED STATES PATENT OFFICE.

JOHN T. SMITH, OF HOPKINS, MINNESOTA.

ATTACHMENT FOR THRESHING-MACHINES.

1,350,847.  Specification of Letters Patent.  Patented Aug. 24, 1920.

Application filed June 11, 1917, Serial No. 174,046. Renewed February 2, 1920. Serial No. 355,586.

*To all whom it may concern:*

Be it known that I, JOHN T. SMITH, a citizen of the United States, resident of Hopkins, county of Hennepin, State of Minnesota, have invented certain new and useful Improvements in Attachments for Threshing-Machines, of which the following is a specification.

My invention relates to that class of attachments for threshing machines shown and described in my pending application filed April 9, 1917, Serial No. 160,786, and designed for a similar purpose, namely, the delivery of clean straw from the rack of the threshing machine to a carrier and from thence to the hopper of a baling press without the necessity of handling in transit.

A further object is to provide an attachment arranged in line with the straw racks at the end of the machine instead of transversely with respect thereto, with provision for directing all the material from the racks to the carrier or allowing it to fall over the racks into the hopper of the blower.

The invention consists generally in various constructions and combinations, all as hereinafter described and particularly pointed out in the claims.

In the accompanying drawings forming part of this specification,

Figure 1 is a side elevation, partially in section, of a threshing machine with my invention applied thereto, showing the attachment in position to receive the clean straw from the racks.

Fig. 4 is a side elevation of a baling press, showing the position of the straw carrier with respect to the hopper, Fig. 5 is a sectional view on the line 5—5 of Fig 4.

Figure 3:
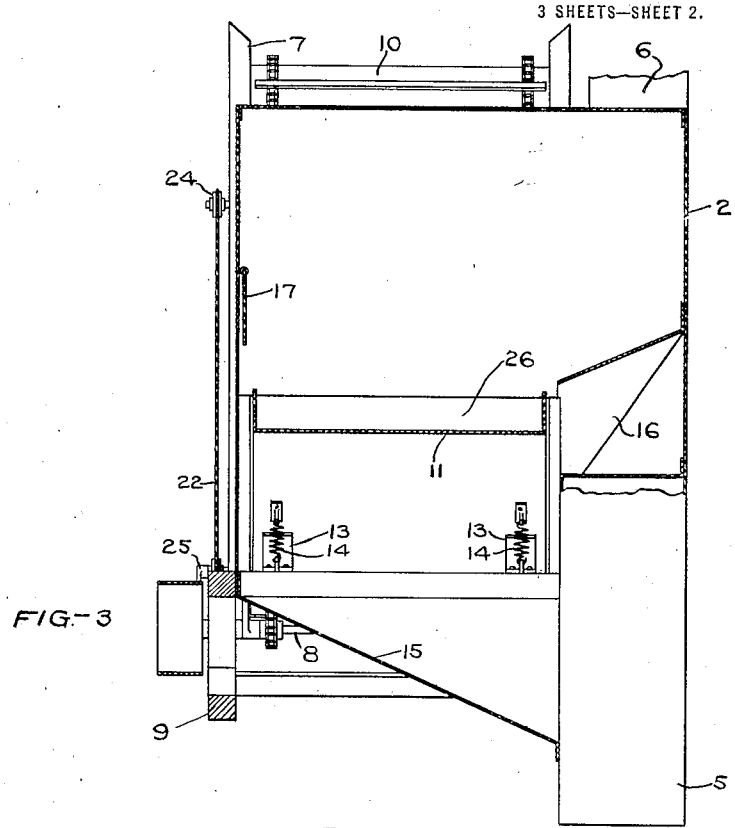
Fig. 3 is a sectional view on the line 3—3 of Fig. 1.
Figure 2:
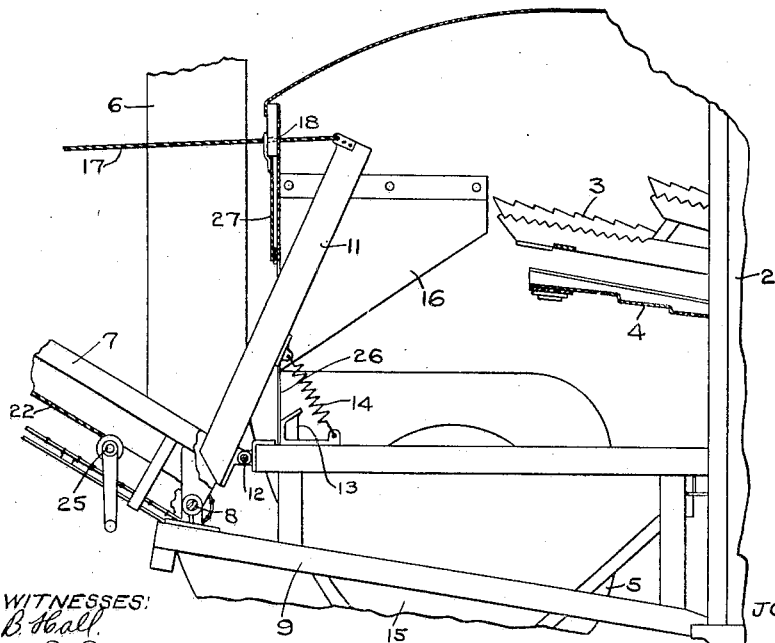
Fig. 2 is a sectional view, showing the slide raised or positioned to direct all the straw into the blower hopper.

In the drawing, 2 represents a threshing machine having a straw rack 3 and a closed bottom pan 4, upon which the grain received from the rack above is returned to the grain pan or cleaning mechanism of the machine. 5 is the blower hopper and 6 a wind stacker tube connected therewith. Ordinarily the straw and chaff are discharged into the blower hopper from the racks and from thence blown out through the stacker tube to a suitable stack.

It is often convenient to utilize the clean straw from a threshing machine for baling purposes and heretofore this straw has been taken from the stack mixed with chaff and other refuse and pitched into the hopper press, an operation requiring considerable hand labor and reducing the value of the bale on account of the chaff and other fine material mixed therein. To economize in labor and at the same time be able to bale the clean straw without any mixture of chaff, I provide a straw carrier frame 7 pivoted at 8 on a portion of the frame 9 of the thresher casing. This carrier instead of being at an angle to the casing or transversely thereof, is substantially in line with it and with the straw racks and extends beyond the end of the casing under the stacker tube. A suitable apron 10 operates in this carrier frame. Between the carrier apron and the straw racks I provide a tilting feed plate 11 hinged at 12 and bridging the space between the apron and the straw racks above the blower hopper. A rest or seat 13 is provided on the frame for this feed plate and it is normally held on this seat by the tension of springs 14. The upper end of the feed plate is positioned beneath the straw rack to receive the clean straw therefrom and direct it upon the apron beneath, while the chaff and fine material sift down through the rack and fall upon the pan 4 for delivery to the cleaning mechanism of the machine.

The feed plate, as shown in Fig. 3, is positioned at one side of the blower hopper, an inclined plate 15 being arranged beneath the feed plate to direct the straw and material falling thereon when the feed plate is raised into the hopper and as the feed plate is not the full width of the machine casing, I provide a plate 16 above the hopper inclined to direct the straw falling thereon into the feed plate from whence it is directed to the carrier beneath. The feed plate is raised by any suitable means. For the purpose of raising the feed plate to move it out of the path of the clean straw whenever desired, I provide a cable 17 attached to the upper end of the plate and extending through a hole 18 to a point near the hopper of a baling press 19, where an attendant is stationed for putting in the follower boards 20 as they are required in the operation of baling. By means of this cable the attendant will have absolute control over the delivery of straw to the blower hopper and the elevating straw carrier, and may direct it to the hopper 21 of the press or to the stacker, as he may desire. Provision is also made for raising or lowering the carrier apron by means of a cable 22 attached at 23 to the casing of the machine and passing around a sheave 24 on the carrier frame to a windlass 25 near the point where said frame is mounted on the casing of the thresher.

The opening 26 in the end wall of the thresher casing may be closed by a door 27 which, when the feed plate is in use, will be supported in the position indicated in Fig. 1. A wall 28 of the baling press hopper is hinged at 29 to drop down upon a platform 30 and is normally supported by a rod 31. This wall receives the straw from the carrier above and directs it into the baling chamber 28 beneath. A bar 33 is pivoted at 34 on said wall and is provided with an operating arm 35 by means of which the bar may be thrown across the passage in the hopper for stopping the feed of straw therein. This will be done while the attendant is placing the follower board in the baling chamber.

I make no claim in this application to these details, the essential feature of the invention being the location of the straw carrier in the end of the threshing machine where it may receive the fresh straw from the racks and deliver it to the press without handling.

The feed plate 11 may have either a tight or perforated bottom, as preferred, and the opening 26 may have a canvas resting loosely on the straw and preventing the dust from passing out of the blower hopper.

The baling press I may put in any suitable position to receive the straw from the carrier, but preferably it is located directly behind the blower and attached to the threshing machine axle, as indicated in Fig. 1. The two machines will then be in tandem and can be moved from place to place without changing or uncoupling from the machine when grain or flax is being threshed, or the straw is being baled in the field.

The attachment can also be operated in connection with a clover or alfalfa huller and bale the hay while it is being threshed. In case I find it convenient to make tow from the flax straw, I can put the tow brake directly behind the blower. The straw can then be delivered directly to the rollers of the flax brake and from thence to the baling press without any hand labor.

It will be understood that the above description and the accompanying drawings comprehend only the general embodiment of my invention as various modifications in detail of construction, proportion and arrangement of the parts may be used within the scope of the appended claims without sacrificing any of the advantages of my invention.

I claim as my invention:

1. The combination, with a threshing machine having an opening in its wall and a straw support and a blower positioned to receive the chaff delivered through said support, of means interposed between said support and said opening and downwardly and outwardly inclined to divert the clean straw from said blower and discharge it through said opening, the chaff and fine material falling through said support into said blower.

2. The combination, with a threshing machine having an opening in its end wall and a straw support and blower, of a straw carrier mounted to receive clean straw delivered through said opening, and means for diverting the clean straw from said support to said carrier and allowing the chaff and refuse to fall into said blower, said means being mounted for adjustment out of the path of the clean straw from said support to allow it, mixed with the chaff, to pass to said blower.

3. The combination, with a threshing machine, of a straw carrier mounted thereon and a feed plate operating through the end wall of said casing for delivering clean straw to said carrier, said plate being adjustably mounted to divert the straw from said carrier or direct it thereon.

4. The combination, with a threshing machine, of a straw carrier mounted at the rear end of said machine and extending backwardly therefrom, a feed plate hinged on said threshing machine and operating through an opening in the end wall of the casing of said machine for delivering clean straw to said carrier, and means connected with said feed plate and extending to a point adjacent the discharge end of said carrier, whereby the attendant may tilt said feed plate and direct the straw toward said carrier or divert it therefrom.

5. The combination, with a threshing machine having a straw support and blower positioned to receive the chaff falling through said support, the end wall of said threshing machine having an opening therein opposite and adjacent said support, of a feed plate positioned between said blower and support and having its receiving end mounted to receive the clean straw from said support, said feed plate being downwardly and outwardly inclined from said support to said opening for directing the clean straw away from said blower and through said opening.

6. The combination, with a threshing machine having a straw support and blower and provided with an opening in its wall, of a feed plate adjustably mounted in said opening between said support and blower to receive the clean straw from said support and deliver it outside said casing or allow said straw and the chaff to be discharged from said support into said blower.

In witness whereof, I have hereunto set my hand this 1st day of June 1917.

JOHN T. SMITH.